Figure 1:
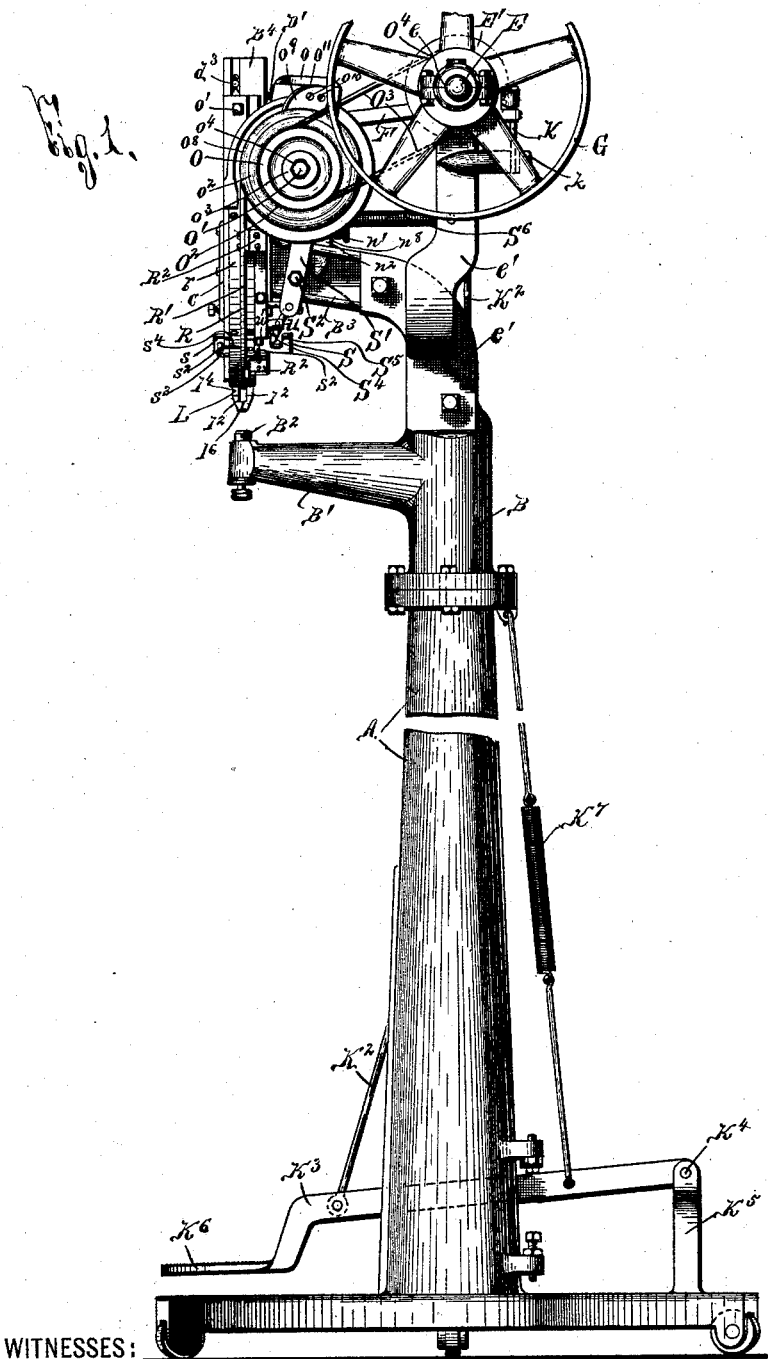
Figure 2:
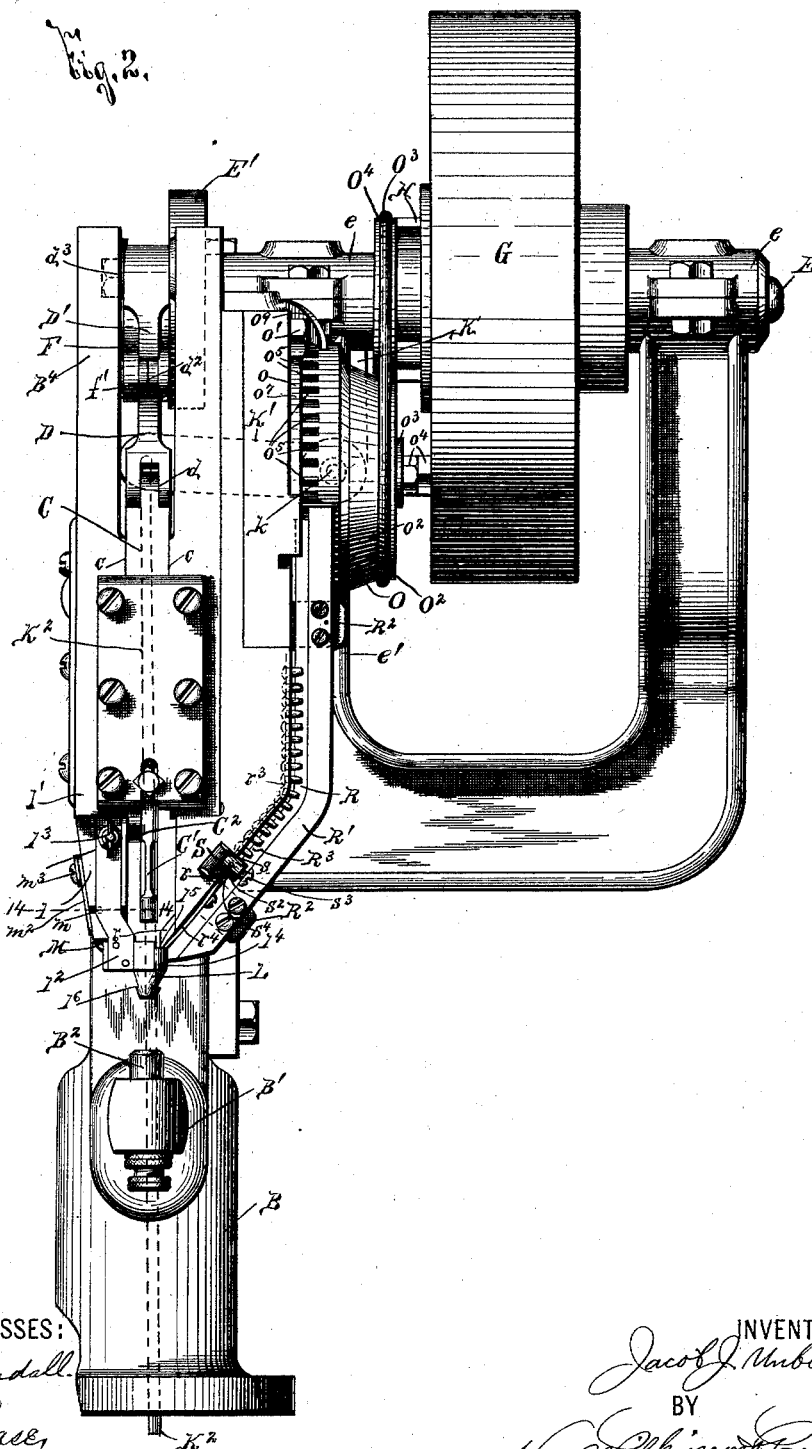

(No Model.) 9 Sheets—Sheet 1.

J. J. UNBEHEND.
RIVETING MACHINE.

No. 523,024. Patented July 17, 1894.

WITNESSES:
H. E. Chase
W. H. Randall

INVENTOR
Jacob J. Unbehend
BY
Hey Wilkinson Parsons
ATTORNEYS (No Model.)  9 Sheets—Sheet 2.

J. J. UNBEHEND.
RIVETING MACHINE.

No. 523,024.  Patented July 17, 1894.

WITNESSES:
W. H. Randall
H. E. Chase

INVENTOR
Jacob J. Unbehend
BY
Heys Wilkinson Parsons
ATTORNEYS (No Model.) 9 Sheets—Sheet 3.

J. J. UNBEHEND.
RIVETING MACHINE.

No. 523,024. Patented July 17, 1894.

WITNESSES:
H. E. Chase
W. H. Randall

INVENTOR
Jacob J. Unbehend
BY
Ney Wilkinson & Parsons
ATTORNEYS.

(No Model.)  9 Sheets—Sheet 4.

J. J. UNBEHEND.
RIVETING MACHINE.

No. 523,024.  Patented July 17, 1894.

WITNESSES:
H. E. Chase,
W. H. Randall.

INVENTOR
Jacob J. Unbehend
BY
Wilkinson & Parsons
ATTORNEYS.

(No Model.) 9 Sheets—Sheet 5.
J. J. UNBEHEND.
RIVETING MACHINE.
No. 523,024. Patented July 17, 1894.
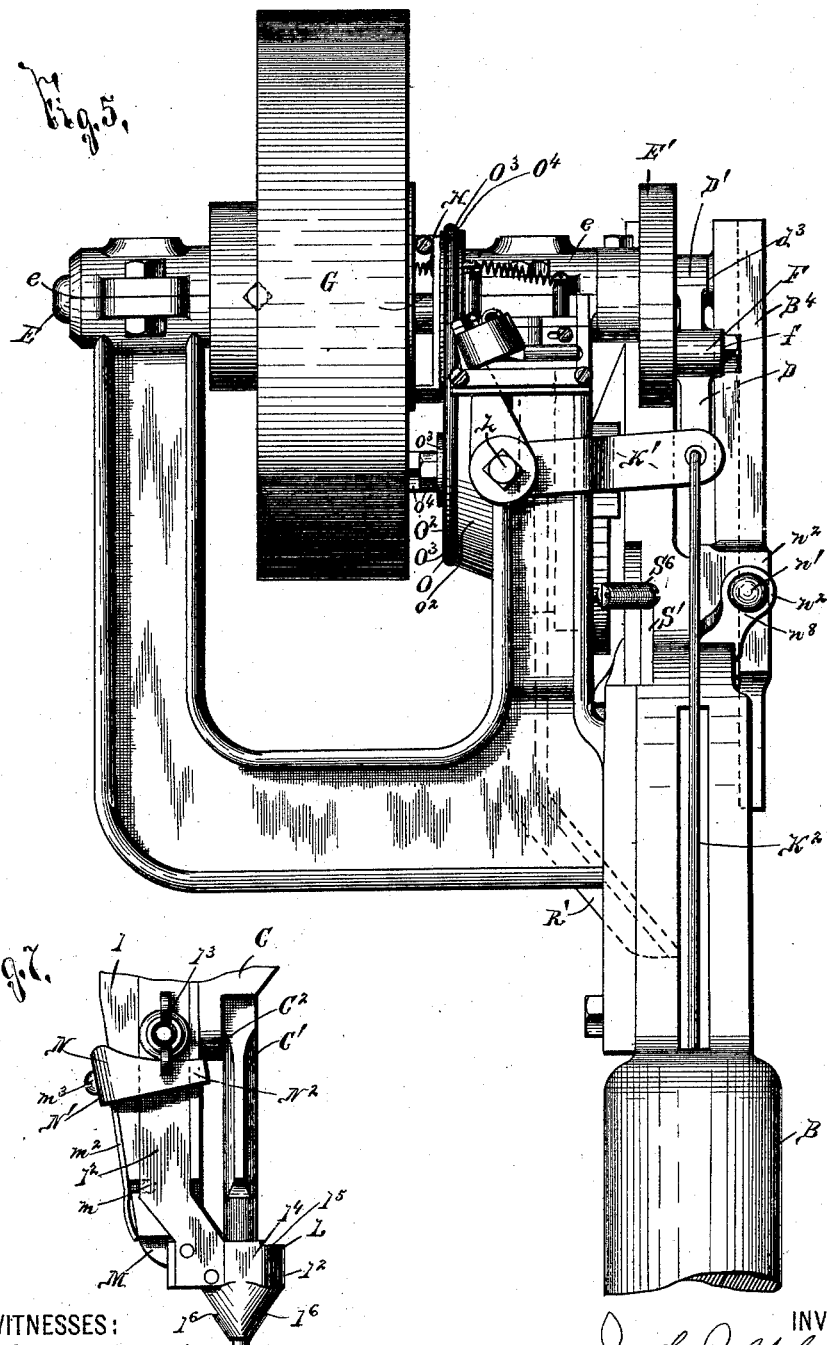
WITNESSES:
W. H. Randall
L. C. Chace
INVENTOR
Jacob J. Unbehend
BY
Hey Wilkinson & Parsons
ATTORNEYS.

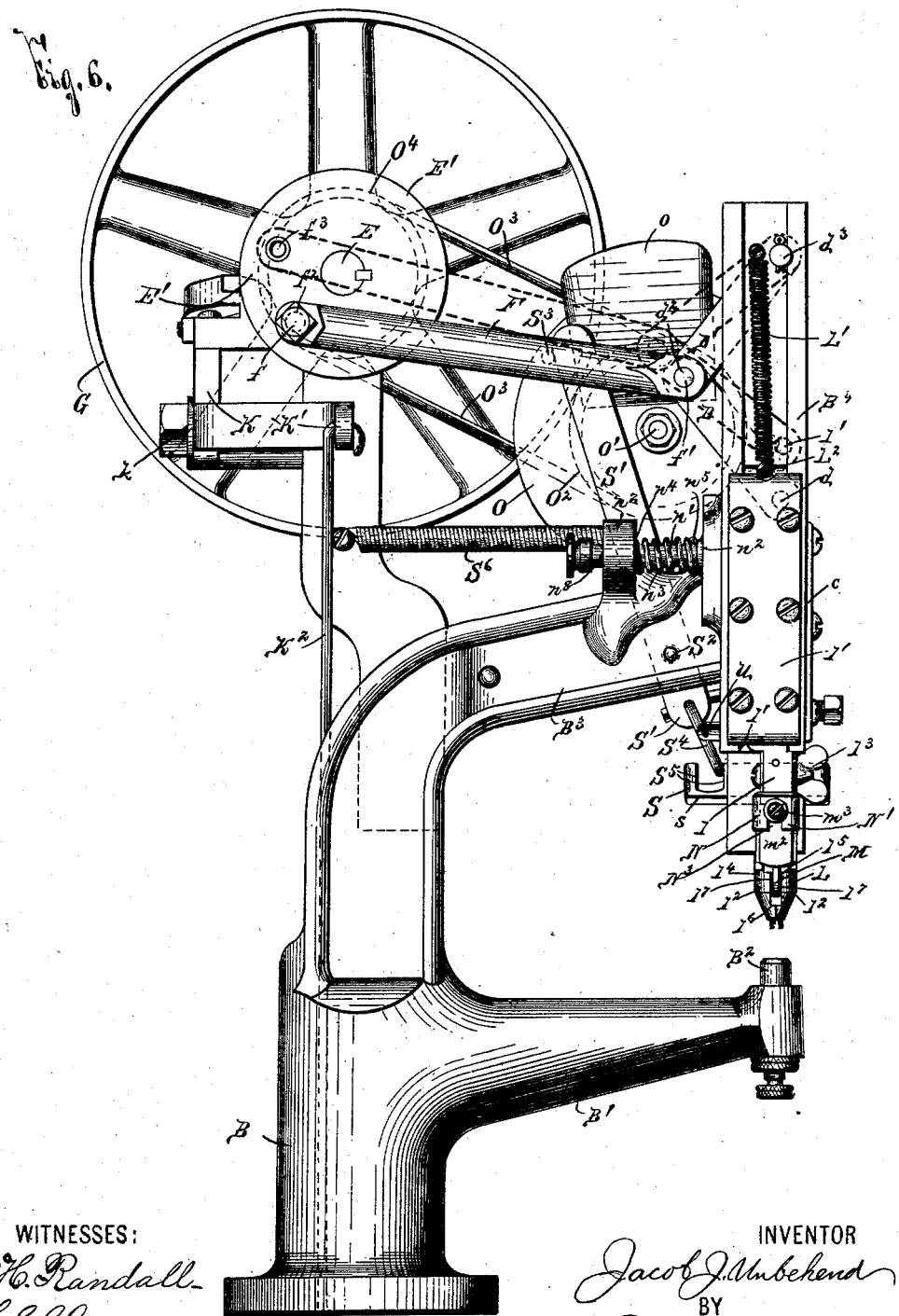

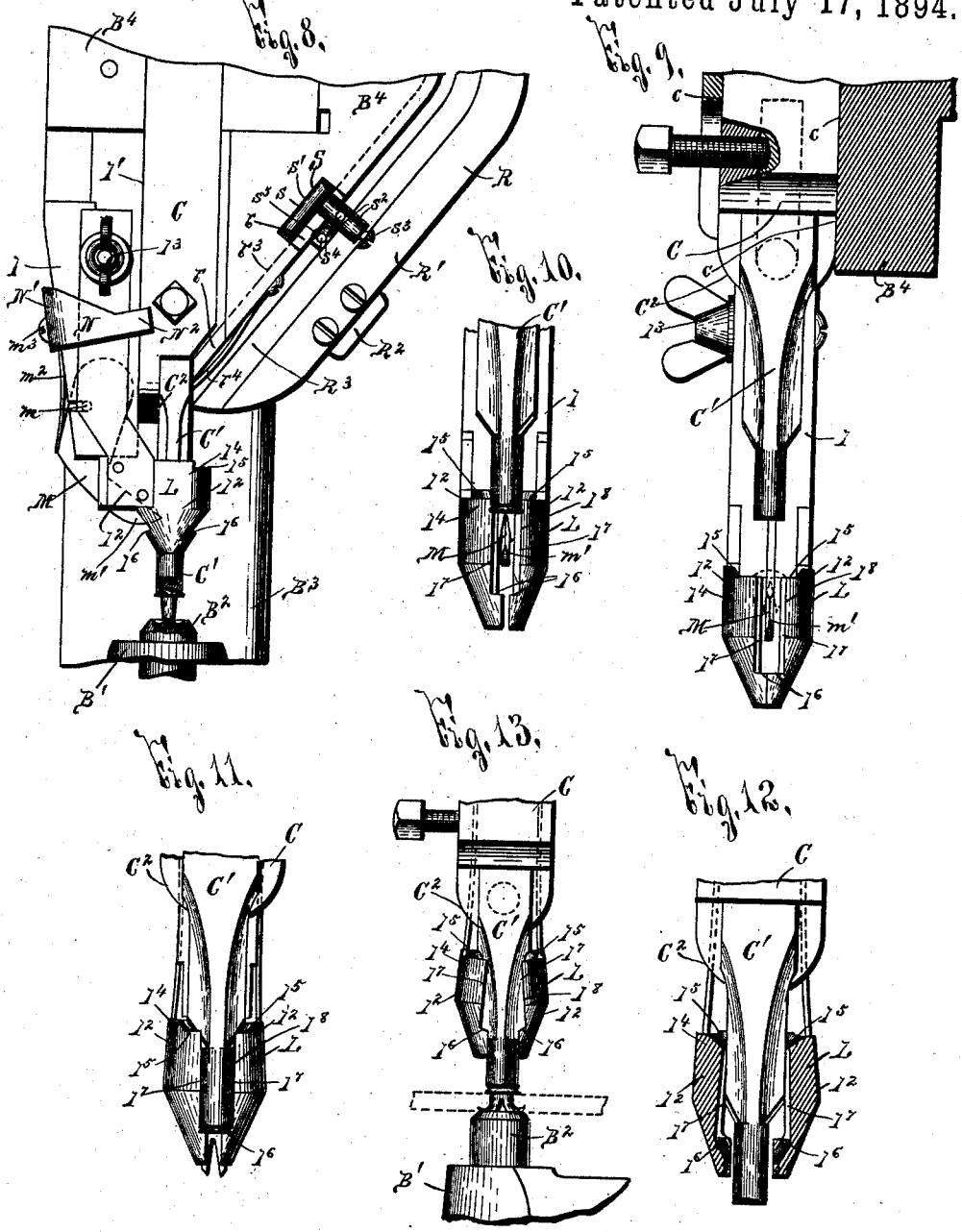

(No Model.) 9 Sheets—Sheet 8.

J. J. UNBEHEND.
RIVETING MACHINE.

No. 523,024. Patented July 17, 1894.

WITNESSES:
W. H. Randall,
H. E. Chase,

INVENTOR
Jacob J. Unbehend
BY
Hey Wilkinson Parsons
ATTORNEYS.

THE NORRIS PETERS CO., PHOTO-LITHO., WASHINGTON, D. C.

(No Model.)

J. J. UNBEHEND.
RIVETING MACHINE.

No. 523,024. Patented July 17, 1894.

9 Sheets—Sheet 9.

WITNESSES:
H. E. Chase,
W. H. Randall

INVENTOR
Jacob J. Unbehend
BY
Hey Wilkinson Parsons
ATTORNEYS.

UNITED STATES PATENT OFFICE.

JACOB J. UNBEHEND, OF WALTHAM, MASSACHUSETTS.

RIVETING-MACHINE.

SPECIFICATION forming part of Letters Patent No. 523,024, dated July 17, 1894.

Application filed September 18, 1891. Serial No. 406,185. (No model.)

*To all whom it may concern:*

Be it known that I, JACOB J. UNBEHEND, of Waltham, in the county of Middlesex, in the State of Massachusetts, have invented new and useful Improvements in Riveting-Machines, of which the following, taken in connection with the accompanying drawings, is a full, clear, and exact description.

My invention relates to improvements in riveting machines, and of that class adapted to be driven by steam power and to similarly arrange the prongs of pronged rivets fed therefrom, and has for its object the production of a simple, effective and durable device, which feeds the rivets automatically and quickly, and projects the extremity of the rivet slightly beneath the rivet receiver extremity before the reciprocal movement of said receiver in order to enable the operator to register with said rivet the opening through which it is to be driven; and to this end it consists, essentially, in a rivet receiver, a plunger for forcing the shank of the rivet slightly below the end of the receiver, a connection between said plunger and receiver for reciprocating the receiver upon the further movement of the plunger, and a shaft adapted to be rotated intermittently.

The invention also consists in the detail construction and arrangement of the parts, all as hereinafter more particularly described, and pointed out in the claims.

In describing this invention, reference is had to the accompanying drawings, forming a part of this specification, in which like letters indicate corresponding parts in all the views.

Figure 3:
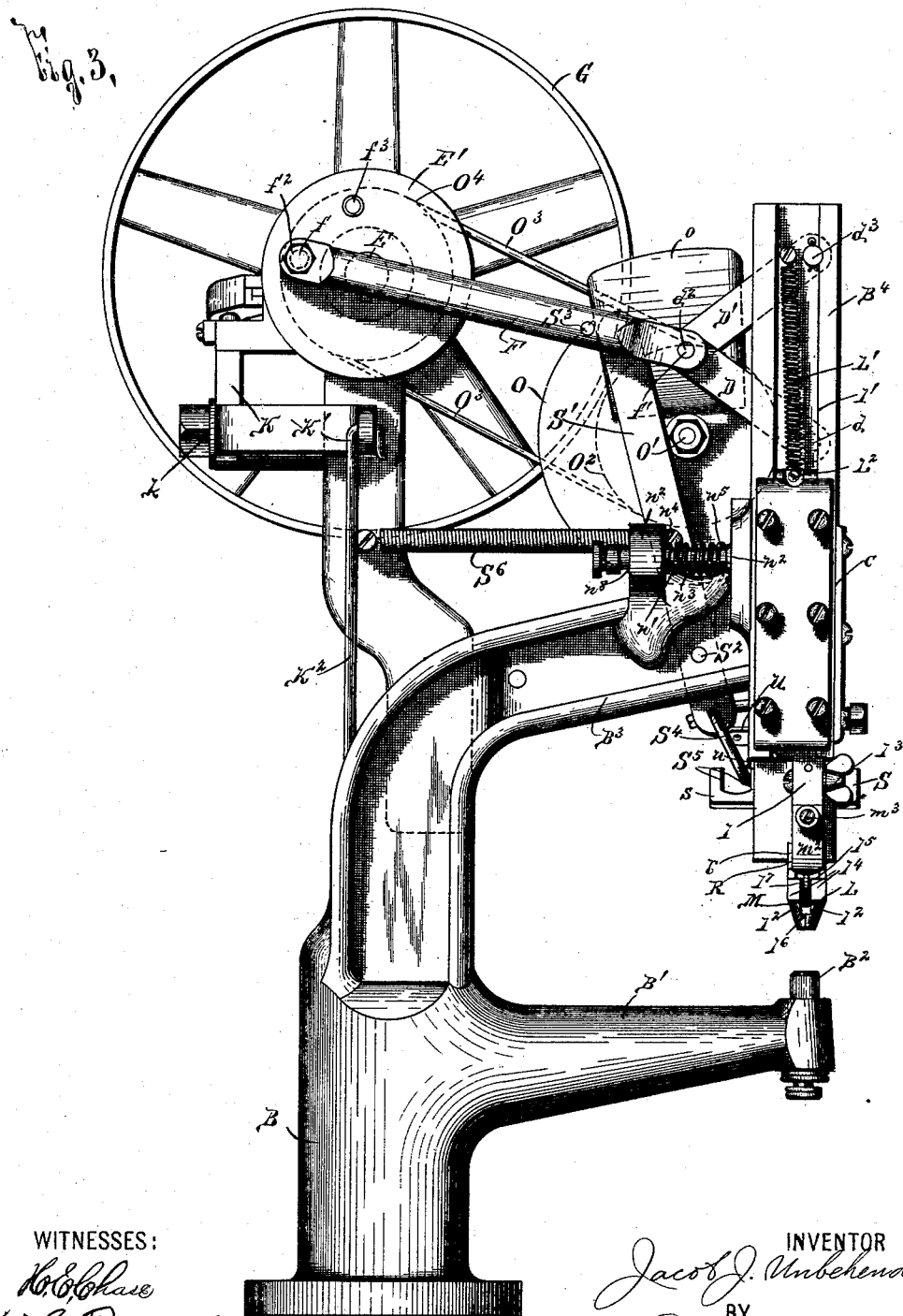
Figure 4:
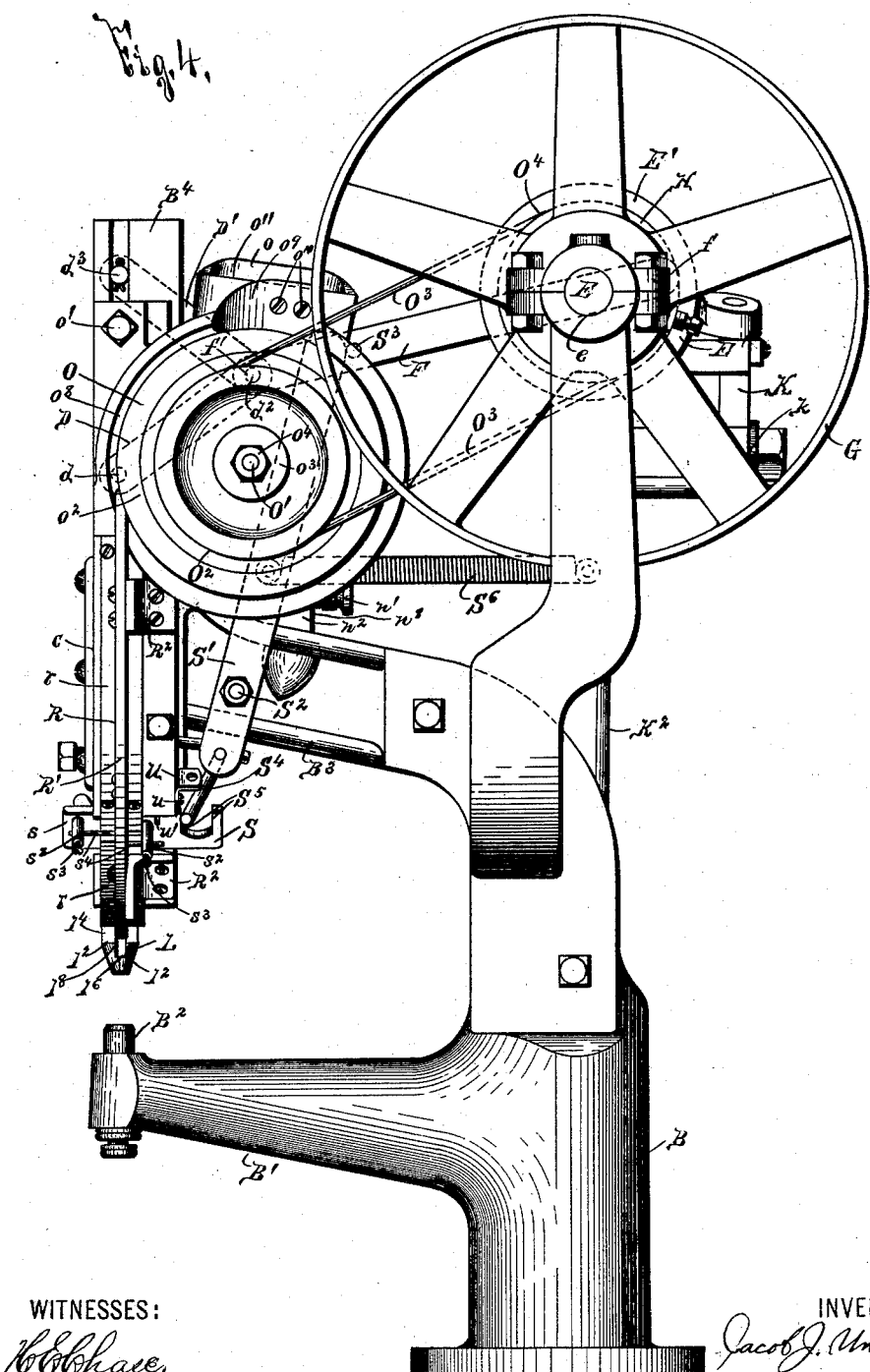
Figure 14:
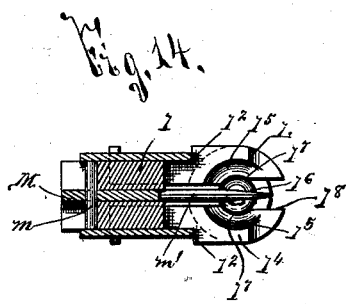
Figure 15:
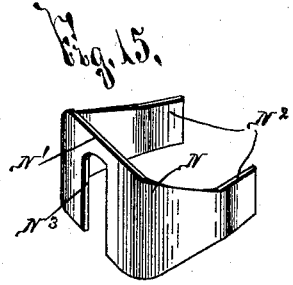
Figure 16:
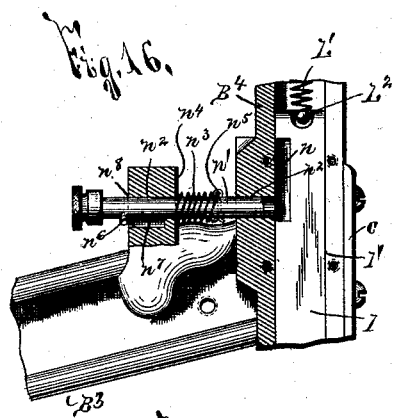
Figure 17:
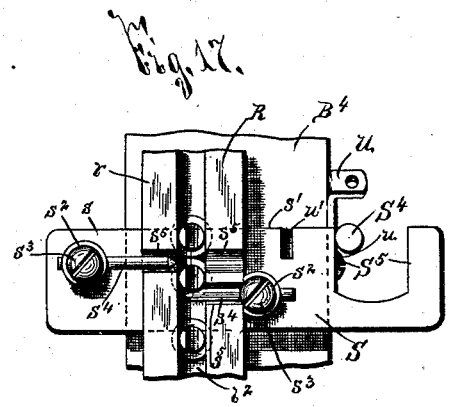
Figure 18:
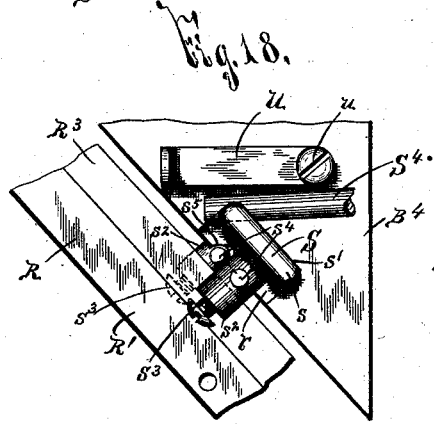
Figure 19:
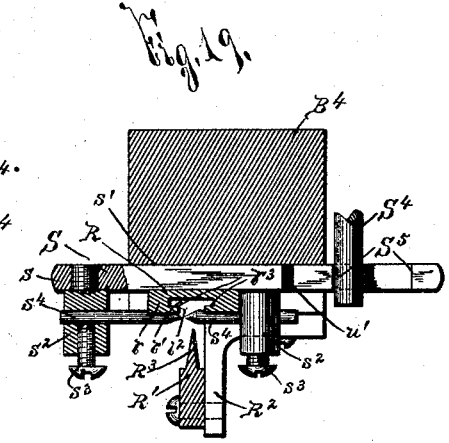
Figure 20:
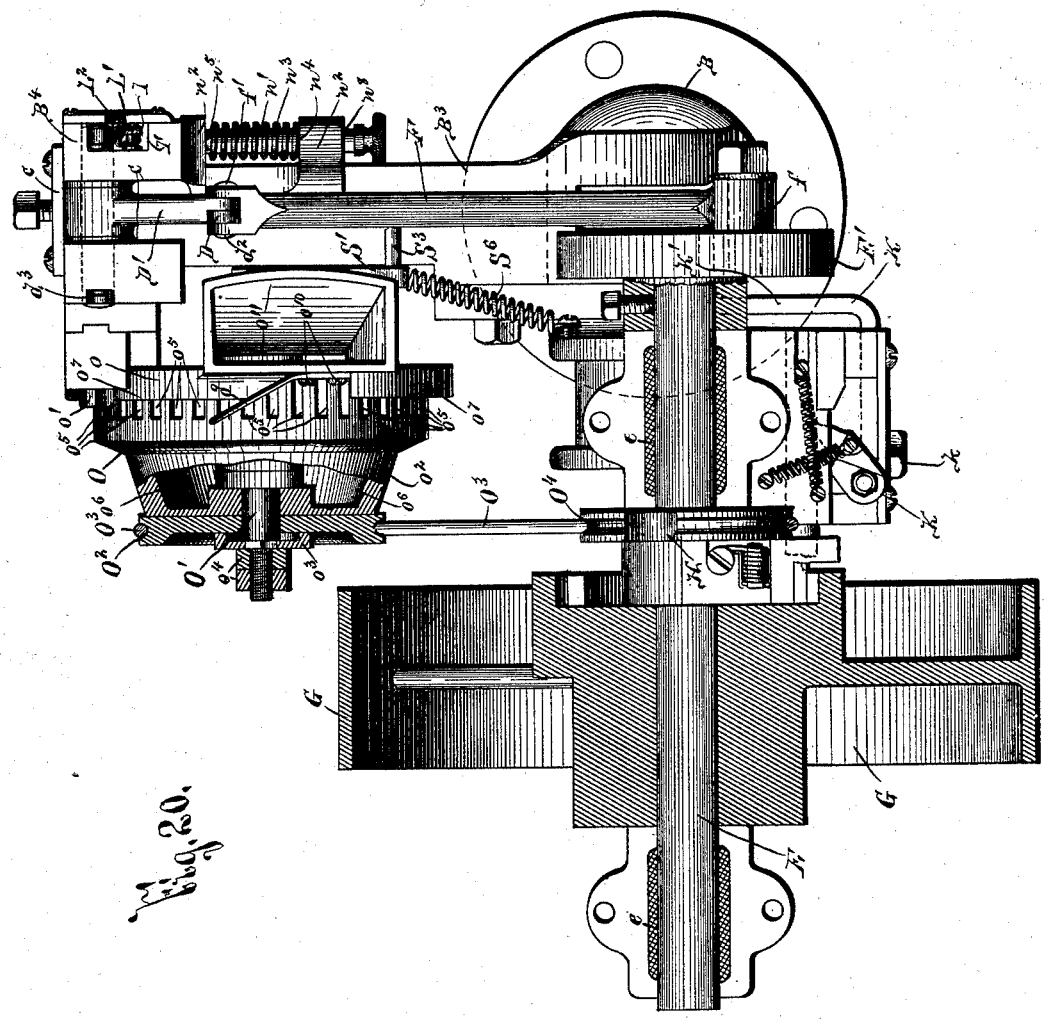

Figure 1 represents a side elevation of my improved invention, the central portion thereof being broken away for the purpose of increasing the scale. Figs. 2, 3, 4, and 5 are respectively front, opposite side and rear elevations of the head of my riveting machine representing the parts as in their dormant position. Fig. 6 is a similar view to Fig. 3 representing the plunger as having forced the rivet slightly below the lower extremity of the receiver before the receiver commences its reciprocal movement. Fig. 7 is a front view of the lower end of the receiver, the plunger and the supporting upright of the head showing the plunger as in its position assumed when the parts are arranged as shown at Fig. 6 and the receiver is about to commence its reciprocal movement. Fig. 8 is an enlarged detached front elevation of the parts as shown at Fig. 7 representing the plunger as having forced the extremity of the rivet shank into contact with the clinching die. Fig. 9 is an enlarged detached inner side elevation of the rivet receiver, the rivet being shown in dotted lines as in its position assumed when first inserted into the receiver. Fig. 10 is a similar enlarged rear elevation, the rivet being shown as partially forced down its guide-way in the receiver, and as having separated the opposite sections of the receiver. Fig. 11 is a similar view to Fig. 10 representing the rivet as in its position assumed when the rivet receiver commences its reciprocal movement. Fig. 12 is a similar view to Fig. 11 representing the plunger as in its extreme downward position, the rivet receiver divisions being shown in section. Fig. 13 is a similar view to Fig. 12 representing the rivet receiver sections in elevation and showing the rivet as clinched by its die. Fig. 14 is a transverse horizontal sectional view, taken on line —14— 14—, Fig. 2. Fig. 15 is a perspective of the detached connection between the rivet receiver and the plunger. Fig. 16 is a detail view representing the stop for the rivet receiver. Figs. 17 and 18 are respectively front and side elevations of the cut off for feeding the rivets one by one in the rivet conveyer. Fig. 19 is a top plan view of the parts as shown at Figs. 17 and 18. Fig. 20 is an enlarged top plan view, partly in section, of the head of my improved invention, representing also the construction of a clutch for intermittently locking the loose pulley to the rotary shaft for bringing the plunger and hopper into operation.

—A— represents the frame or standard of the machine; —B— its head provided with the laterally extending arm —B'— carrying a suitable clinching die —B²—, and with the upper laterally extending arm —B³— carrying the upright arm —B⁴—, all as best seen at Fig. 1.

—C— is the plunger movable in a guide —c— in the upright arm —B⁴—, and provided with a plunger rod —C'—; —D— a lever pivoted at —d— to the upper extremity of the plunger, and —D'— a second lever pivoted at —$d^2$— to the former lever —D—, and at —$d^3$— to the upper extremity of the upright arm —$B^4$—.

The rotary shaft —E— is mounted in suitable bearings —c— provided on an upwardly extending bracket —e'— secured to the head —B—, and is formed at one extremity with a disk —E'— to which at —f— is pivoted one end of a link —F— pivoted at is opposite extremity at —f'— to the pivot $d^2$ between the toggle levers —D— and —D'—. It will readily be understood that, as the shaft —E— is rotated, the plunger —C— is reciprocated toward and away from the die —$B^2$— for inserting and clinching the rivets.

Loosely journaled on the shaft —E— is a pulley —G— (see Fig. 20), and rigidly secured to said shaft —E— is a disk H adapted to intermittently lock the loose pulley —G— to said shaft —E— by means of a suitable clutch.

The rocking lever —K—, previously mentioned, is pivoted at —k— to a post upon the bracket —e'—, and is provided with a projecting arm —K'—, which is loosely connected by a link —$K^2$— to one extremity of a lever —$K^3$— pivoted at —$K^4$— to an upright post —$K^5$— upon the base of the standard —A—, and provided at its other extremity with a foot engaging portion —$K^6$—. By depressing the foot engaging portion —$K^6$— of this lever —$K^3$— the upper extremity of the rocking lever —K— is forced outward for disengaging the clutch from the gear —G—, and upon releasing the pressure of the foot, a spring —$K^7$— pivoted to said lever —$K^3$— and to the standard —A— immediately retracts said lever to its normal position.

—L— is the rivet receiver consisting of the body or frame —l— having its upper extremity mounted in a guide —l'— formed on the upright —$B^4$— and its lower end provided with two spring separable sections —$l^2$— secured to said body —l— by a clamp —$l^3$—. The receiver is drawn upward into its normal position by means of a spring —L'—, having one end secured thereto at —$L^2$— and the other to the upper extremity of the upright arm —$B^4$— of the head —B—. At the lower end of said sections are the enlarged extremities —$l^4$—, which are provided at their adjacent surfaces with the upper and lower rivet engaging shoulders —$l^5$—$l^6$— and the grooves or rivet guide-way —$l^7$—.

—M— (Figs. 7 and 8) represents a guide having one extremity pivoted at —m— to the frame or body —l— and the other formed with the laterally extending rib or projection —m'— arranged between the lower lateral ends —$l^4$— of the sections —$l^2$— within the groove —$l^7$— and beneath the upper shoulders —$l^5$—.

A spring —$m^2$— is secured at one end to the receiver frame or body —l— by a screw —$m^3$— and bears at its opposite extremity against the lower end of the guide —M— for forcing its projection —m'— into operative position.

As shown at Fig. 16 the upper extremity of the receiver body or frame —l— is formed with a recess —n— into which projects the inner end of a stop bolt —n'—, which is mounted in bearings —$n^2$— on the head —B—; encircled by a spring —$n^3$— bearing against a shoulder —$n^4$— of the bearing —$n^2$—, and a shoulder —$n^5$— on the bolt; and provided with a lug —$n^6$— movable in a recess —$n^7$— and adapted to be withdrawn from said recess and turned to engage with the shoulder —$n^8$— when designed to hold the dog in its retracted position and permit the free movement of the receiver.

—N—, Figs. 8 and 15, is a yielding shoulder projecting from the wall of the receiver and adapted to be engaged by a shoulder —$C^2$— on the plunger —C— for effecting the reciprocal movement of the receiver after the rivet prongs have been forced by the plunger beneath the lower extremity of said receiver. This shoulder —N— consists preferably of a central portion —N'— having projecting arms —$N^2$— at its opposite extremities, one of which is engaged by the plunger shoulder —$C^2$—, and having a slot —$N^3$— through which for securing the shoulder in position is passed the screw —$m^3$—, which secures the spring —$m^2$— to the rivet body —l—.

The rivets, as presently described, are inserted one by one into the receiver through a slot —$l^8$— with their heads imposed upon the top shoulders —$l^5$— and the prongs of their shanks on opposite sides of the projection —m'— of the rib or guide —M—. The plunger, as previously described, is forced downward into contact with the head of the rivet, and forces the same downwardly through the rivet guide —$l^7$— until its shank projects slightly beneath the extremity of the rivet receiver —L—, and its head is engaged by the lower shoulders —$l^6$—; the opposite sections —$l^2$— of the rivet receiver being somewhat separated during this downward movement of the rivet and plunger.

The strength of the spring —L'— is so proportioned in relation to the strain required to separate the sections —$l^2$— and the speed of the plunger that the receiver sections or springs —$l^2$— are readily separated, as described, with the lower extremity of the rivet shank projecting beyond the lower end of said receiver before the plunger operates to force the receiver downwardly.

As soon as the plunger has forced the lower extremity of the rivet beneath the end of the rivet receiver the shoulder —$C^2$— on the plunger encounters the shoulder —$N^2$— or the connection —N— and forces the receiver downwardly until the upper extremity of the slot —n— is engaged with the inner end of the locking dog —n'—, whereupon the movement of the receiver is stopped and the plunger shoulder —C²— forces the yielding shoulder —N— of the receiver outward, continues its further movement and clinches the rivet in position. This particular construction of parts, which compels the lower end of the rivet shank to slightly project below the lower end of the receiver before the receiver commences its downward movement and retains said rivet and receiver in the same relative position until the stoppage of the movement of the receiver, enables the operator to readily center the hole through which the rivet is to be driven, with said rivet before the rivet is clinched, and is invaluable in attaching buckles to straps, rubber coats, arctics, and in the attachment of like devices and forms an essential feature of my present invention.

In some cases it is neither necessary nor desirable to project the shank of the rivet beneath the end of the receiver before the plunger communicates motion to said receiver. Consequently the disk —E'— is provided with an additional aperture —$f^3$— in which the pin —$f$— and the lever —F— are secured instead of in the lower aperture —$f^2$—. By thus providing two apertures —$f^2$— and —$f^3$— the lever —F— is adjustably mounted on said disk —E'—, and is shown as secured to the lower aperture —$f$— in the first five views of the drawings and in dotted lines at Fig. 6 as secured to the apertures —$f^3$—.

—O— is the rivet hopper composed of the stationary section —$o$— secured at —$o'$— to the upright arm —$B^4$—, and the movable section —$o^2$— frictionally clamped by a washer —$o^3$— and nuts —$o^4$— to a shaft —O'— suitably journaled in the upright arm —$B^4$—.

The movable section —$o^2$— is formed at its peripheral edge with a series of cut outs —$o^5$— opening outwardly from its central chamber —$o^6$—, and its peripheral edge is revolved in close proximity to an overlapping rib —$o^7$— formed on the stationary hopper section —$o$— and provided, as best seen at Figs. 1, 2, 4, and 20, with the outlet guide or recess —$o^8$— in its inner wall into the upper end or inlet of which the rivets feed outwardly from the passages —$o^5$—.

A plate —$o^9$— is secured at —$o^{10}$— to one wall of the inlet opening —$o^{11}$— of the hopper —O—, and is formed with an outwardly projecting extremity, which inclines across the peripheral edge of the movable hopper section —$o^2$—, and tends to force the rivets either into the recess —$o^8$— or back into the chamber —$o^6$—.

The movable hopper section is formed with a bearing face —$O^2$— upon which is revolved a belt —$O^3$— passed over a bearing face —$O^4$— on the disk —H—, which, as previously stated, is locked to the shaft —E—, and is rotated when the dog —I— engages the loose pulley —G—. It will thus be seen that the rivets are constantly fed into the recess —$o^8$— by the revolution of the movable hopper section —$o^2$— effected by the connection or belt —$O^3$— from the revolving shaft —E—.

Should any of the rivets become caught in the hopper it is evident that the belt may slip along the face —$O^3$— without turning the movable hopper section or the pulley, or as the pulley is only frictionally secured to the shaft O' said pulley may revolve loosely on the shaft.

—R— represents the rivet conveyer leading from the lower end or outlet of the guide or recess $o^8$ and consisting of the inner guide —$r$— formed with the recesses —$r'$— and —$r^2$— adapted to receive the rivet head and shank and with the shoulder —$r^3$— for engaging the under face of the rivet's head and preventing its escapement; and the outer guide —R'— secured in position by brackets —$R^2$— and formed with an inclined projection —$R^3$— adapted to register with the space interposed between the rivet prongs. The upper extremity of this outer guide extends upwardly into the recess —$o^8$— and prevents any of the rivets feeding down the conveyer until their prongs are arranged on opposite sides of said projection —$R^3$—.

In order to turn the rivets when within the recess —$o^8$— for the purpose of facilitating the registration of the space interposed between their prongs with the upper end of said rib —$R^3$— the recess —$o^8$— is made sufficiently narrow so that the rivets rest against the adjacent surface of the movable hopper section and are turned in said recess by its revolution.

The conveyer extends to the rivet receiver —L—, the inner guide being imposed directly above the receiver and formed with a yielding shoulder —$r^4$— instead of the rigid shoulder —$r^3$— for permitting ready escapement of the rivets from said inner guide. The end of the rib —$R^3$— extends in close proximity to the lateral projection —$m'$— of the guide or rib —M—, which projection virtually forms a continuation of the rib —$R^3$—. It will thus be seen that the rivets are conducted to the receiver with their prongs similarly arranged and are placed therein with their prongs on opposite sides of the projection —$m'$—, being thereby prevented from turning when within the receiver.

—S— represents the cut off for feeding the rivets one by one, which consists of a sliding bar —$s$— interposed between the inner and outer guides —R— and —R'— and movably mounted in the guide —$s'$— in the upright arm —$B^4$—.

On opposite sides of the conveyor —R— upon said cut off bar —$s$— are posts —$s^2$— $s^2$— in which by means of screws —$s^3$— are secured projecting pins —$s^4$— arranged one above the other with their extremities in close proximity and adapted to be reciprocated in grooves —$s^5$— in the shoulder —$r^3$—.

A bar or lever —S'— is pivoted at —$S^2$— to the head —B— with one extremity adapted to be engaged by a shoulder —S³— on the link —F— and the other provided with a spring connection —S⁴— adapted to engage shoulders —S⁵— on the cut off bar S for reciprocating the same.

As the plunger is moved downward the upper end of the lever —S'— is rocked forward and the cut off bar —s— withdrawn backward, thus forcing the upper projection —s⁴— into the path of the rivets and permitting the rivet interposed between said projections to pass downwardly along the lower end of the conveyer, the upper rivets being held from passage by said upper bar —s⁴—. As the plunger is returned a spring —S⁶— secured to said lever retracts the same and forces the lower projection —s⁴— into the rivet path, thus permitting a rivet to feed between said projections —s⁴—.

—U— represents a stop lever, which is pivoted by a pin —u— at one extremity to the upright —B⁴—, and is adapted with its opposite free end to engage a notch —u'— in the cut off bar —S— for stopping the same from operation. It will be understood that the hopper and plunger may operate even though said cut off bar is stopped, as stated, since the spring —S⁴— is capable of yielding sufficiently to permit such operation without breakage.

The operation of my improved riveting machine will be readily perceived from the foregoing description and upon reference to the drawings, and it will be particularly noted that its parts are simple in construction and operation and necessarily durable in wear; that before the downward movement of the receiver the lower end of the rivet shank is forced below the end of the said receiver for enabling the operator to register therewith the hole through which the rivet is to be passed, and that at every operation of the plunger the rotary shaft for communicating motion to the various parts of my machine is automatically stopped for permitting the clinching of but one rivet at a time.

It will be noted that I do not herein limit my riveting machine to the precise detail construction and arrangement of the parts of my invention as the same may be somewhat varied from those shown and described without departing from the spirit of my invention.

Having thus fully described my invention, what I claim as new, and desire to secure by Letters Patent, is—

1. In a riveting machine, the combination with a rivet receiver having an engaging shoulder and separable spring sections provided with a guideway for the rivets and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, and means, substantially as described, for operating the plunger, substantially as and for the purpose described.

2. In a riveting machine, the combination with a rivet receiver having an engaging shoulder adjustably mounted thereon, and having separable spring sections, provided with a guideway for the rivets and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders, and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, and means, substantially as described, for operating the plunger, substantially as and for the purpose specified.

3. In a riveting machine, the combination with a rivet receiver having a yielding engaging shoulder, and having separable spring sections provided with a guideway for the rivets and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders and for discharging the rivets from the receiver, an upwardly inclining shoulder provided on said plunger for engaging the receiver shoulder and normally separated a greater distance from the receiver shoulder than the lower end of the plunger is normally separated from the heads of the rivets when discharged within the guide way of the receiver and being movable beyond the receiver shoulder, a spring for preventing the movement of the receiver until its shoulder is engaged by the plunger shoulder and for retracting said receiver, a stop for limiting the movement of said receiver, and means, substantially as described, for operating the plunger, substantially as and for the purpose described.

4. In a riveting machine, the combination with a rivet receiver having oppositely arranged yielding engaging shoulders adjustably mounted thereon and having separable spring sections provided with a guideway for the rivets, and with shoulders for engaging the rivet heads, said rivet head engaging shoulders being separated a less distance from the lower end of the receiver than the length of the rivet shanks; of a plunger for forcing the rivet shanks through said guideway and engaging the heads of the rivets with said engaging shoulders, and for discharging the rivets from the receiver, oppositely arranged shoulders provided on said plunger for engaging the yielding shoulders of the receiver and normally separated a greater distance from said receiver shoulders than the lower end of the plunger is normally separated from the heads of the rivets when discharged within the guideway of the receiver and being movable beyond the receiver shoulders, a spring for preventing the movement of the receiver until its yielding shoulders are engaged by the plunger shoulders, and for retracting said receiver, a stop for limiting the movement of said receiver, and means, substantially as described, for operating the plunger, substantially as and for the purpose specified.

5. In a riveting machine, the combination of a rivet receiver composed of separable spring sections having laterally extending extremities provided with a longitudinal guideway formed in their adjacent faces and having a contracted lower end, and outwardly inclining shoulders at its upper end and inwardly inclining shoulders interposed between said contracted extremity and upper shoulders, an engaging shoulder on the receiver, a plunger movable through said guideway, and provided with a shoulder for engaging said receiver shoulder, a spring for retracting the receiver, a stop for limiting the movement of the receiver, and means for operating the plunger, substantially as and for the purpose described.

6. In a riveting machine, the combination with a stationary hopper section provided with an outlet guide or recess in its inner wall of a revoluble agitating hopper section for feeding the rivets into said outlet guide or recesss of the stationary section and having its peripheral face movable at one side of said guide or recess and separated substantially the same distance from the face of said guide or recess as the diameter of the rivets for engaging and rolling the rivets in said guide or recess, substantially as and for the purpose specified.

7. In a riveting machine, the combination with a stationary hopper section provided with an outlet guide or recess in its inner wall, and a revoluble agitating hopper section for feeding the rivets into said outlet guide or recess of the stationary section and having its peripheral face movable at one side of said guide or recess and separated substantially the same distance from the face of said guide or recess as the diameter of the rivets for engaging and rolling the rivets in said guide or recess; of riveting mechanism substantially as described, a conveyer leading from said outlet guide or recess to the riveting mechanism, and a projection on the conveyer astride which the rivet prongs pass, substantially as and for the purpose set forth.

8. In a riveting machine, the combination with the stationary and revolving hopper sections, an outlet recess into which the rivets are fed from said hopper, and means for rotating the rivets individually while in said recess; of riveting mechanism substantially as described, a conveyer leading from said outlet recess to the riveting mechanism, and a projection on the conveyer astride which the rivet prongs pass, as and for the purpose set forth.

9. In a riveting machine, the combination with a rivet receiver having an engaging shoulder and separable spring sections provided with a guideway for the rivets and with shoulders for engaging the rivet heads, said rivet head engaging shoulders being separated a less distance from the lower end of the receiver than the length of the rivet shanks; of a plunger for forcing the rivet shank through said guideway and engaging the rivet heads with said engaging shoulders, and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, a rotary disk, and a connection having one end secured to the disk and the other connected to the plunger, substantially as and for the purpose described.

10. In a riveting machine, the combination with a rivet receiver having an engaging shoulder and separable spring sections provided with a guideway for the rivets, and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders, and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, a rotary disk having separated points of attachment, and a connection having one end pivoted to either of said points of attachment on the disk and the other end connected to the plunger, substantially as and for the purpose described.

11. In a riveting machine, the combination with a rivet receiver having an engaging shoulder and separable spring sections provided with a guideway for the rivets, and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders, and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder, and for retracting said receiver, a stop for limiting the movement of said receiver, a rotary disk, a connection having one end secured to the disk and the other end connected to the plunger, and a revolving pulley for effecting the revolution of the disk, substantially as and for the purpose specified.

12. In a riveting machine, the combination with a rivet receiver having an engaging shoulder and separable spring sections provided with a guideway for the rivets, and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders and for discharging the rivets from the receiver, a shoulder provided on the plunger for engaging the receiver shoulder and normally separated a greater distance from the receiver shoulder than the lower end of the plunger is normally separated from the heads of the rivet when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, and means, substantially as described, for operating the plunger, a conveyer for conducting the rivets to said receiver and a cutoff for regulating the passage of the rivets through the conveyer, substantially as and for the purpose described.

13. In a riveting machine, the combination with a rivet receiver having an engaging shoulder and separable spring sections provided with a guideway for the rivets and with shoulders for engaging the rivet heads, said rivet head engaging shoulders being separated a less distance from the lower end of the receiver than the length of the rivet shanks; of a plunger for forcing the rivet shanks through said guideway and engaging the rivet heads with said engaging shoulders and for discharging the rivets from the receiver, a shoulder provided on the plunger for engaging the receiver shoulder and normally separated a greater distance from the receiver shoulder than the lower end of the plunger is normally separated from the heads of the rivets when discharged within the guideway of the receiver and being movable beyond the receiver shoulder, a spring for preventing the movement of the receiver until its shoulder is engaged by the plunger shoulder and for retracting said receiver, a stop for limiting the movement of said receiver, levers pivoted together at their adjacent extremities, one of said levers having its opposite end pivoted to the plunger, a stationary support to which the opposite end of the other lever is pivoted, a rotary disk, a connection having one end secured to the disk and the other end pivoted to the adjacent extremities of the lever, a conveyer for conducting the rivets to said receiver, a cutoff for regulating the passage of the rivets through the conveyer, substantially as and for the purpose specified.

In testimony whereof I have hereunto signed my name, in the presence of two attesting witnesses, at Waltham, in the county of Middlesex, in the State of Massachusetts, this 15th day of July, 1891.

JACOB J. UNBEHEND.

Witnesses:
ENOS T. LUCE,
JOHN P. NOBLE.